May 26, 1970          A. W. LOHMANN          3,514,177
HOLOGRAPHY OF NON-COHERENTLY ILLUMINATED OBJECTS
Filed Sept. 11, 1967

INVENTOR.
ADOLF W. LOHMANN

BY *Arthur Decker*
Attorney

# United States Patent Office 3,514,177
Patented May 26, 1970

3,514,177
HOLOGRAPHY OF NON-COHERENTLY ILLUMINATED OBJECTS
Adolf W. Lohmann, Los Gatos, Calif., assignor to International Business Machines Corporation, Armonk, N.Y., a corporation of New York
Filed Sept. 11, 1967, Ser. No. 666,861
Int. Cl. G02b 27/00
U.S. Cl. 350—3.5                3 Claims

ABSTRACT OF THE DISCLOSURE

A holographic storage system for non-coherently illuminated objects in which a prism-pair doubler receives the illumination from the object and generates a pair of virtual, symmetrical, conjugate, inverted images. The images are focussed onto film by a spherical-cylindrical lens combination also used for the reconstruction.

---

Figure 1:
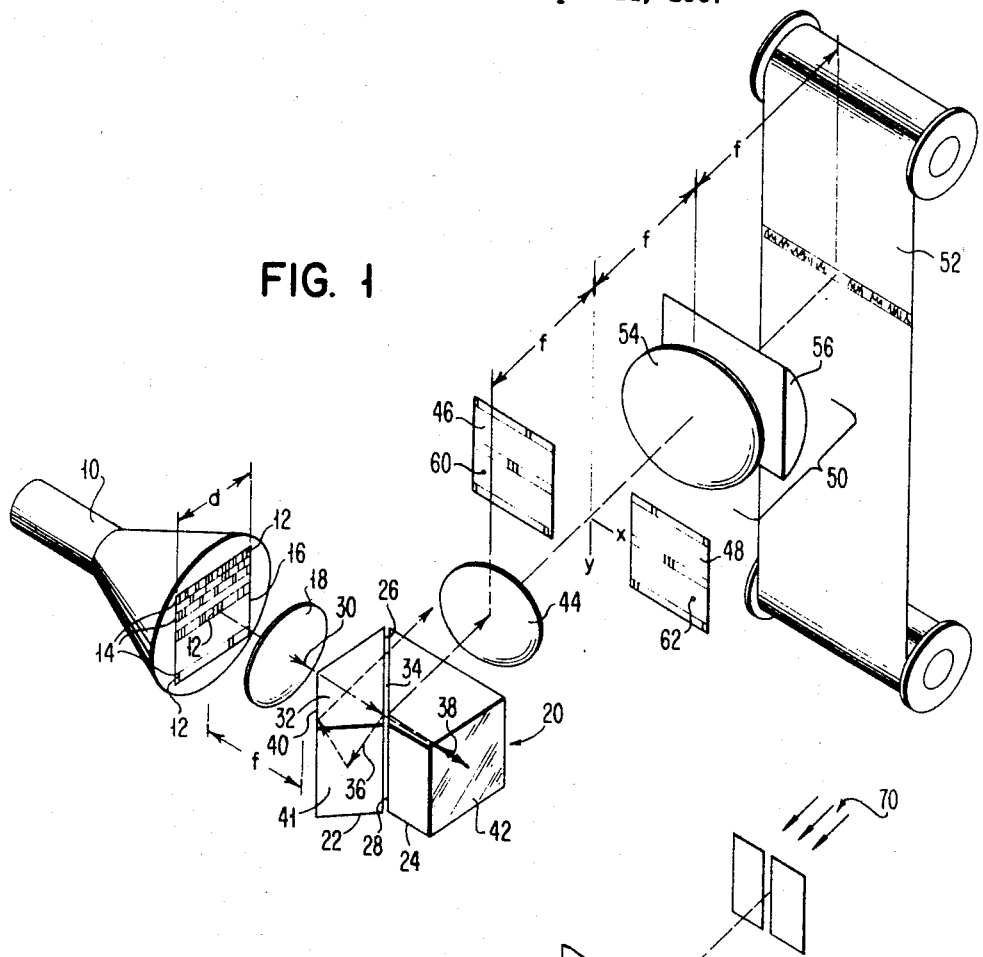

This invention relates to optical storage systems and, more particularly, to making holograms of self-luminous objects or objects illuminated by non-coherent light.

A hologram is the picture, usually a photograph, obtained at a distance from an object when the scattered light beam from the object is accompanied by a background beam. A hologram appears quite differently from the original, yet it records all the information, i.e., magnitude and phase, about the object's scattered wavefront so that an image of the object may be reconstructed in recognizable form. It may be additionally noted that the hologram also contains a complete description of the entire space between the photographic film and the light source; as a result the same hologram may be used to reconstruct any intervening objects.

A survey of the holographic art indicates that the source used for illumination is generally coherent, monochromatic and of small dimensions. These constraints necessitates that a practical optical system involve filters, lenses, mirross, prisms, etc. in delicate, complex and cumbersome arrangements difficult to synchronize and subject to the accumulation of noise in the form of dirt and dust and internal imperfections. A system utilizing a non-coherent illumination source such as an ordinary incandescent lamp, or in which the object is self-luminous, such as a cathode ray tube display or a display consisting of the ends of fiber light "pipes," would avoid such complexity if this light is monochromatic (spatially incoherent) and therefore would be preferred, provided, however, that the resultant hologram would still completely describe the object and that a faithful image could be reconstructed therefrom. It is an object of this invention to provide such a system.

In digital information storage and retrieval systems utilizing photographic film as the storage medium, representation of bits is by transparent and opaque spots, each in a prescribed area of the film; the high resolution available might provide for a bit density exceeding almost any other system but it has been noted that the density achieved in an operating system is considerably below the theoretical limit. This has been attributed to the difficulty of locating a particular discrete area and the introduction of spurious signals by the presence of dirt, scratches on the film, etc. Thus, each bit area is usually made sufficiently large to minimize misreading or other possible loss. It follows that the full resolution capabilities of the films are not utilized. It is a further object of this invention to avoid this difficulty by incorporating the inherent redundancy of holographic recording into the system.

As is known, holography with spatially incoherent illumination is satisfactory only if a limited number, for instance 100, object points contributes to the hologram; this limitation has been attributed to the dynamic range of photographic film. It is another object of this invention to avoid this difficulty. This is accomplished by a feature which partitions the two-dimensional hologram into a plurality of one-dimensional holograms (i.e., horizontal strips), each of which is exposed by light from only one horizontal slice of the object. Thus, although each object section may contain the limited number of luminous points, the total object can contribute many thousands of such points.

A further object of this invention is to provide a holographic system for storage of arrays of binaries recorded on a digital photographic film such as the "Cypress" chip; for this purpose, the invention incorporates equipment for generating, storing and accessing a plurality of one-dimensional diffraction patterns, one corresponding to the binaries recorded on one line of the chip.

Holograms in general can be of two types: Fresnel and Fraunhofer (Fourier). In the former, each point of the object is recorded as a Fresnel zone plate which, in reconstruction of an image of the object, acts as a lens. The lateral position of the center of the Fresnel zone plate determines the lateral position of the corresponding image point. In the latter, each point of the object is recorded as a system of equidistant diffraction fringes which, in reconstruction of an image of the object, acts as a diffraction grating. The fringe distance varies inversely as the lateral position of the corresponding object point. In reconstruction, diffraction occurs at an angle which varies directly with the fineness of the grating, and an additional lens is used to focus the diffraction pattern to points constituting the image. It is a further object of this invention to provide a system as previously described, adaptable to either Fresnel or Fraunhofer hologram recording and reconstruction.

Figure 2:
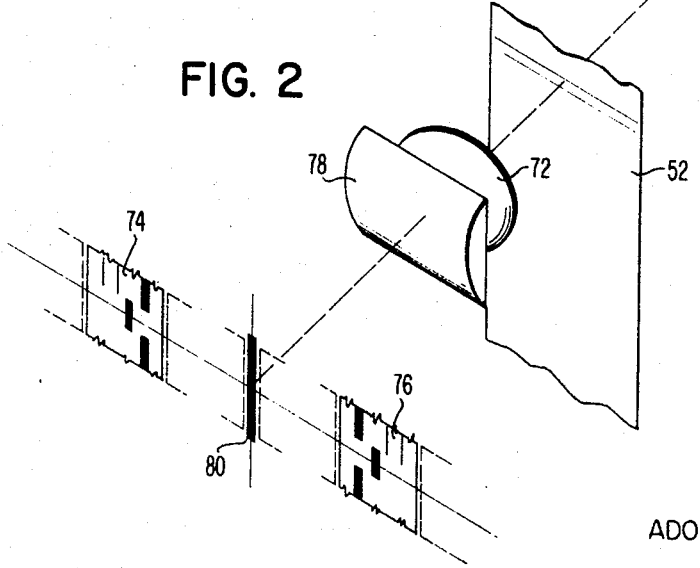

The foregoing and other objects, features and advantages of the invention will be apparent from the following more particular description of a preferred embodiment of the invention, as illustrated in the accompanying drawings, in which:

FIG. 1 shows a hologram recording system in accordance with the invention and, FIG. 2 shows an optical system capable of reproducing images of the object recorded by the equipment of FIG. 1.

The basis of holography resides in the phenomenon of interference, i.e., the combination of light beams such that reinforcement and cancellation of illumination takes place. Since this combination, to comprise a steady-state effect, must originate with a prescribed and constant phase difference between the beams, it follows that, in practice, the two beams are best generated by splitting a single beam. Also implied is the condition that the light emission from each point of the source, when modulated, i.e., diffracted or reflected by an object on its path, shall provide an identical fringe pattern in the same place at the image plane.

Beams which comply with the aforementioned criteria are known as coherent; coherent beams are most suitable for recording light amplitude and phase, reflecting or issuing from an object. In the art of holography, then, a beam splitter divides the light from a source, one secondary beam illuminates the object while the other falls onto a photographic plate. Light from the object is also directed at the plate at an angle to the direct beam. Exposure and development of the plate results in the hologram, i.e., the interference pattern of the two beams, from which the object beam may be reconstructed if the hologram is illuminated by the direct beam at its original angle.

Spatial coherence has, in the past, generally appeared to be essential in holography. However, recent developments have indicated that holograms can be recorded with spatially non-coherent beams and images of good quality can be reconstructed from them, i.e., it does not matter whether or not the light beams emanating from different points on the object are coherent. This is based on the realization that it is only essential that each point of the object somehow generate its own Fresnel zone pattern on the photographic plate. On reconstruction, each Fresnel zone pattern acts as a lens and therefore can produce an image of its point.

The present invention provides a Fresnel zone pattern for each point by generating double conjugate images of the object; these are focussed by a lens system onto the film. Further, in order to relate to the handling of digital information, the invention includes a lens system which provides one-dimensional spectrum analysis of the object. The invention about to be described is operative for spatially incoherent monochromatic light. In more popular terms, it will only work with monochromatic or quasi-monochromatic light. This is as each point in the original object, that will be shown, forms a hologram onto the recording material. These superposed holograms will be formed without interaction between them. If coherent light were used, light from all of the holograms formed, would interact and destroy the scheme.

Referring now to FIG. 1, here is shown cathode ray tube 10 as the output device of a computer system (not shown); the beam of tube 10 presents the configuration 16 of a digital chip, comprising sequences of transparent and opaque verticals aligned horizontally in lines 14. Thus, for present purposes, chip 16 may be considered a self-luminous object. This self-luminescent source would, as mentioned previously, have to be monochromatic or quasi-monochromatic in its nature. Light emanating from chip 16 is collimated by lens 18 and directed toward beam splitter 20, an optical devices composed of two prisms 22 and 24 positioned adjacently. Facing surfaces 26 and 28 of splitter 20 perform the beam-splitting function and are parallel and separated by interstice 34, dimensioned less than a fraction of the wavelength of the light used for illumination; thus, effects extraneous to beam splitting, such as refraction, are substantially eliminated for beam 30 when directed at and passing through surface 32 substantially perpendicularly. The angle of interstice 34 is such that beam 30 reflects as beam 36 in prism 22 and transmits as beam 38 in prism 24. The former, by total internal frustrated reflection at surfaces 40 and 41, passes out of splitter 20 in the direction shown. The latter is reflected upon itself by mirror surface 42 in prism 24, and again reflected by surface 28 to pass out of splitter 20 in a direction substantially the same as that for beam 36. The reflection of beam 36 in prism 22 in the direction towards lens 44 may be considered as the reference wave, and the beam in the direction of lens 44 from beam 38 reflecting in prism 24 may be considered as a direct wave.

The paths of beams 36 and 38 lead to lens 44 which creates images 46 and 48, of chip 16. The optics provided by the lenses and prisms of the system are such that images 46 and 48 are symmetrically conjugate with respect to the vertical $y$ axis and separated from each other in the horizontal $x$ axis by a distance at least twice the width $d$ of chip 16. Thus, each point 60 on image 46 will have a corresponding point 62 on image 48. Images 46 and 48 are focussed by lens assembly 50 onto photographic film 52 which after exposure and developing, comprises the hologram.

Lens assembly 50 consists of two lenses 54 and 56, the former spherical and the latter cylindrical, closely positioned. The lens system 50 is an astigmatic lens system which images image 46 and 48 onto hologram 52 in the vertical direction but forms a diffraction pattern of the images in the horizontal direction. As shown on the diagram in FIG. 1, $f$ represents the focal length of 54 and 56 jointly, and 44 and 40. With this lens system, as will be explained, the Fraunhofer diffraction pattern of images 46 and 48 is obtained on 52 in the horizontal direction. Each point pair 60, 62 can form interference fringes (a Fresnel zone plate) in the rear focal plane of lens 54; however, lens 56 compresses the Fresnel zone plate vertically into a horizontal line having a $y$-coordinate the same as that for the point pair. It is these one-dimensional fringe patterns that are recorded on hologram 52. As a result of the described arrangement, the $y$-coordinate of every binary on chip 16 is preserved on hologram 52, but, in the $x$-coordinate, the encoding process is complete, i.e., chip 16 and hologram 52 bear no visible resemblance. Thus, in the first dimension, the object points are directly imaged whereas in the second dimension, the object points are imaged as Fourier transformations. As mentioned before, in FIG. 1, the Fraunhofer diffraction pattern of image 46 and 48 is obtained in recording means 52 in the horizontal direction. Hologram 52 is shown as a roll of photographic film which may be advanced in synchronism with line sweeps of the beam of tube 10; thus, each line of binaries on chip 16 may be recorded as a holographic line on hologram 52.

From FIG 1, it is thus seen that beam 36 undergoes three reflections in prism 41 whereas beam 38 undergoes two reflections in prism 42; it should be apparent that, since it is desired to provide a pair of images 46 and 48 which are relative inversions, any beam-directing arrangement which splits the original beam and provides an odd number of reflections for one portion and an even number of reflections for the other, will serve satisfactorily.

FIG. 2 shows the arrangement for reconstructing the information recorded in hologram 52. Collimated light beam 70 illuminates an accessed line on hologram 52, the interference fringes thereon acting as a diffraction grating. The two first diffraction orders in the rear focal plane of lens 72 comprise two symmetrical images 74 and 76. Cylinder lens 78 is stationed adjacent lens 72 in order to maintain the $y$-information. Since the film on which hologram 52 is recorded is not a linear medium, harmonic distortions occur and give rise to higher-than-first-order diffraction; the $y$-axis separation previously mentioned insures that these higher orders are suitably separated. Also due to the same cause, difference frequencies in hologram 52 are generated and produce light in the vicinity of zero diffraction order 80; the separation ensures that images 74 and 76 will be distinguished clearly.

While the invention has been particularly shown and described with reference to a preferred embodiment thereof, it will be understood by those skilled in the art that various changes in the form and details may be made therein without departing from the spirit and scope of the invention.

What is claimed is:

1. A holographic system for storage of objects for which illumination is non-coherent, comprising:

an object;

means to generate quasi-monochromatic light beams from said object;

beam-splitting means positioned to intercept the light beams from said object, to generate first and second spaced, parallel light beams directed in the same direction toward a first lens, said beam-splitting means having a plurality of reflective surfaces for reflecting one of said beams through an even number of reflections and the other of said beams through an odd number of reflections for generating said first and second light beams as relative inversions of each other to form two real images of the object in the same plane, each of which is the same in a first dimension and a mirror-image of the other in a second dimension perpendicular to said first dimension;

a second lens located after said first lens and along the optical axis of said first lens, said second lens having different focal lengths in said first and second dimensions and spaced by its front focal plane distance in said second dimension from the image plane of said first lens, to focus at the rear focal plane of said second lens in said second dimension a real image of said first and second real images in said first dimension and a Fraunhofer pattern of said first and second real images in said second dimension; and recording means located at the Fraunhofer pattern image plane of said second lens, to record said real images and said Fraunhofer pattern, whereby in said first dimension said object is recorded as direct images whereas in said second dimension said object is imaged as a Fraunhofer pattern.

2. The system of claim 1 wherein said second lens comprises a spherical lens element and a cylindrical lens element.

3. The system of claim 1 wherein said beam-splitting means comprises a pair of prisms each contributing one surface to beam splitting, said surfaces being plane parallel and separated by a distance less than the wavelength of the illumination at least one of which is positioned to provide total reflection by frustration.

References Cited

Leith et al., Jour. of the Optical Soc. of Am., vol. 52, No. 10, October 1962 pp. 1123–1130.

Stroke et al., Applied Physics Letters, vol. 7, No. 9, November 1965 pp. 229–230.

Worthington, Jour. of the Optical Soc. of Am., vol. 56, No. 10, October 1966 pp. 1397–1398.

DAVID SCHONBERG, Primary Examiner

R. J. STERN, Assistant Examiner